April 28, 1936. J. M. BIERER 2,039,271
VULCANIZING METHOD AND MACHINE
Filed March 8, 1935 3 Sheets-Sheet 1

Inventor
JOHN M. BIERER
by Henway & Witter
Attorneys

April 28, 1936.  J. M. BIERER  2,039,271
VULCANIZING METHOD AND MACHINE
Filed March 8, 1935   3 Sheets-Sheet 2
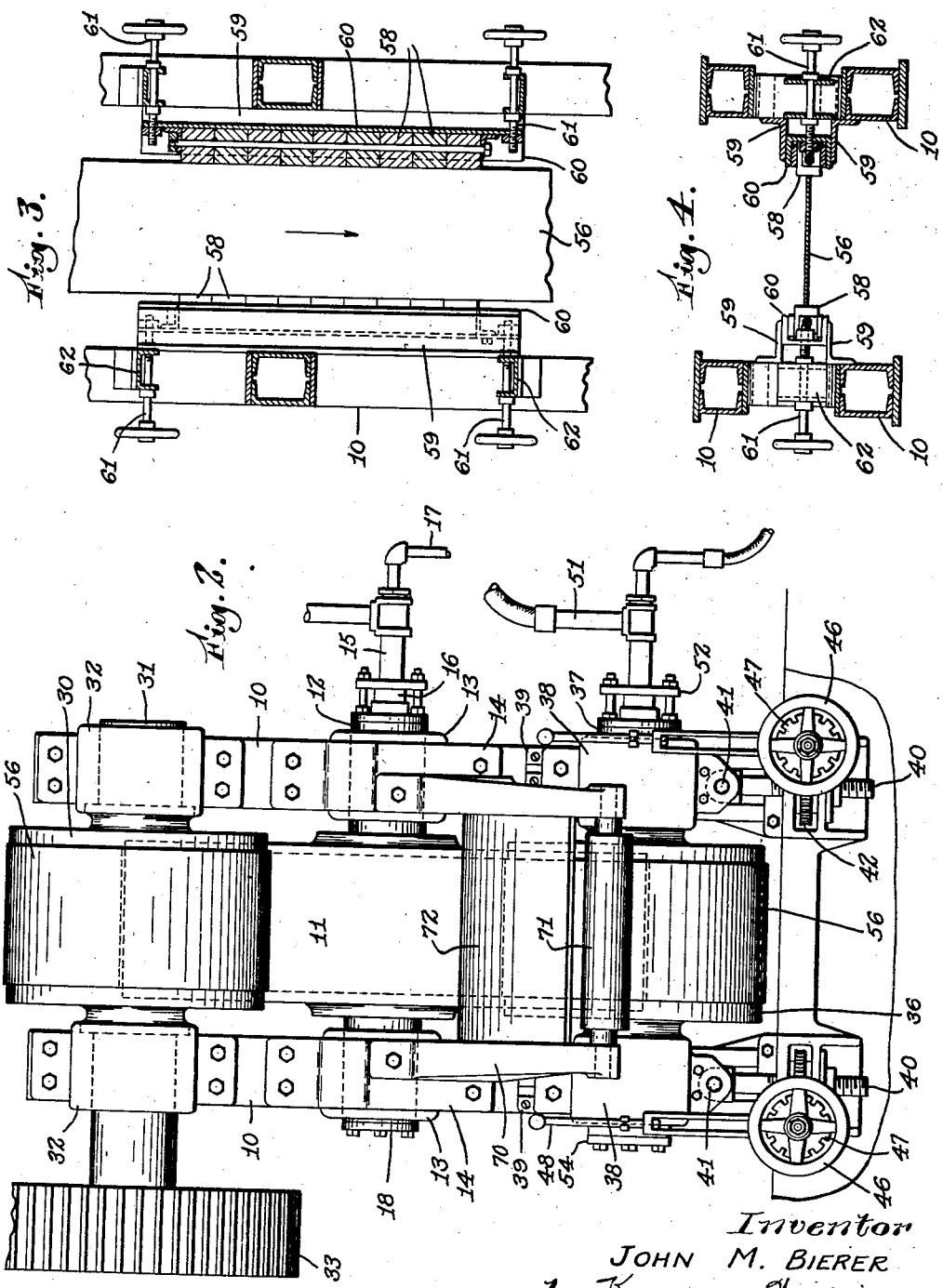
Inventor
JOHN M. BIERER
by Kenway & Witter
Attorneys

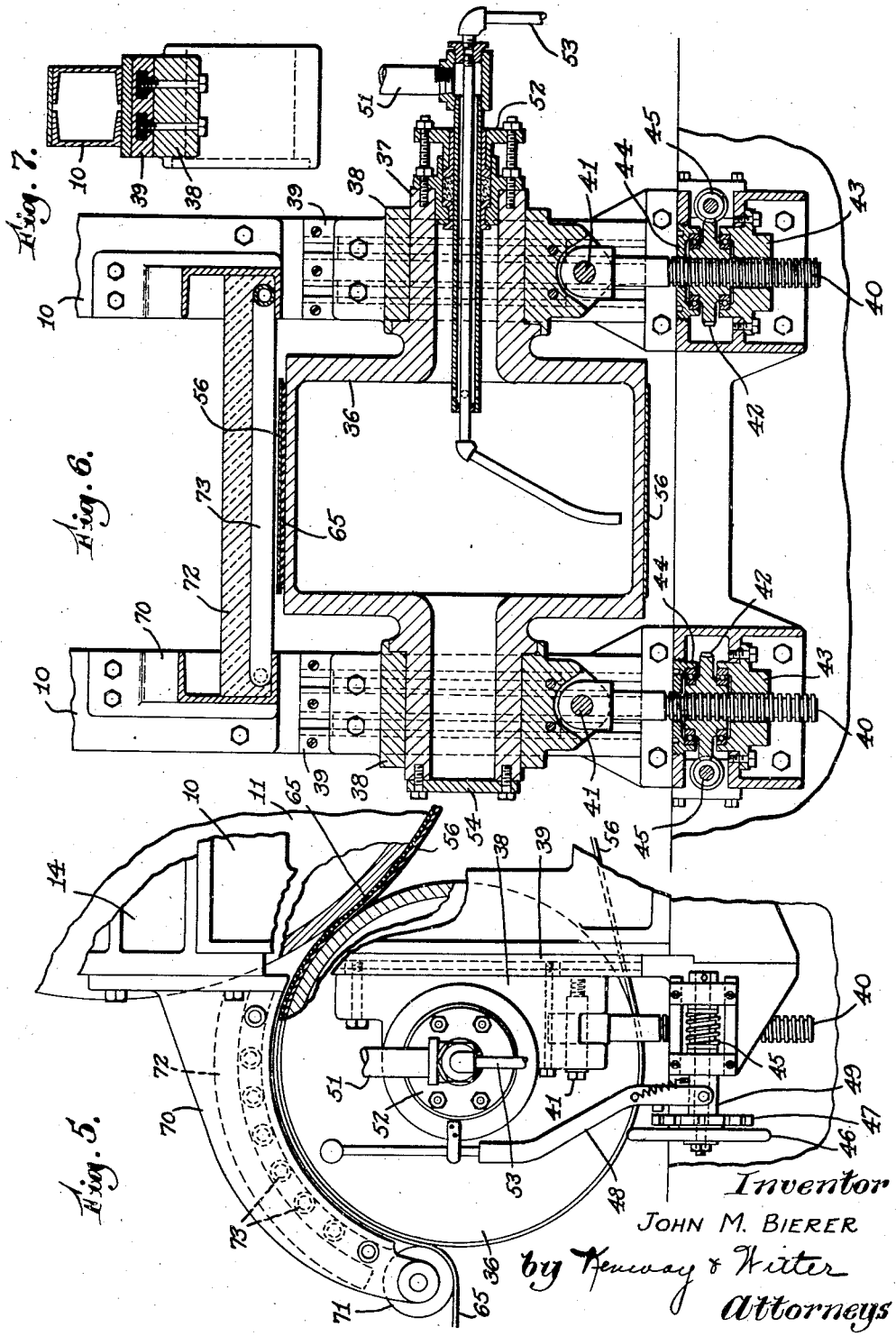

Patented Apr. 28, 1936

2,039,271

UNITED STATES PATENT OFFICE 2,039,271

VULCANIZING METHOD AND MACHINE

John M. Bierer, Newton, Mass.

Application March 8, 1935, Serial No. 10,005

7 Claims. (Cl. 18—6)

This invention relates to a novel vulcanizing method and to vulcanizing machines of the general type shown in my U. S. Letters Patent No. 1,987,890 dated January 15, 1935, in which is employed a heated vulcanizing cylinder and an endless band tensioned about the cylinder and adapted to receive between the band and cylinder sheet material to be vulcanized, the tension on the band providing the vulcanizing pressure of the material against the cylinder. In machines of this type, it is important to flatten or otherwise mold the unvulcanized rubber, after it has become heated and thereby rendered plastic, early in its passage about the circumference of the cylinder and prior to the vulcanizing thereof, which alters the plastic state of the material. It is difficult to secure sufficient molding pressure between the tension belt and the cylinder early in the path of engagement of these two elements because the tension of the band is in a direction more or less tangential to the circumference of the cylinder. In my patent above mentioned I have disclosed a pressure roll arranged to bear against the tension band and press it firmly toward the cylinder in a location such as to subject the material to molding pressure after it has traveled a relatively short distance in contact with the circumference of the vulcanizing cylinder and has thereby had an opportunity to become heated and rendered plastic.

One object of my present invention is to provide improved mechanism for first heating and then flattening or molding the material to a uniform thickness directly as it passes onto the vulcanizing cylinder. I have discovered that in accomplishing this end it is possible to utilize one of the band supporting rolls of the machine and an important feature of my invention consists in a vulcanizing machine so organized that one roll may serve these two functions. By this feature of my invention not only is an extra pressure roll eliminated but the use of a roll of relatively large diameter is permitted and generally the organization of the machine is simplified and improved, as well as the operations performed thereby, all as hereinafter described.

As herein shown and in accordance with another feature of my invention, the pressure roll is heated and has cooperating therewith a heating jacket whereby the material to be vulcanized is given a preliminary heating to render it plastic prior to its contact with the vulcanizing cylinder. Thus the material is molded under adequate pressure to a predetermined thickness immediately as it engages the vulcanizing cylinder, and thereafter it receives the vulcanizing treatment without further disturbance during the entire period it is in contact with the vulcanizing cylinder.

Another feature of the invention resides in the employment of a pair of guides for engaging the edges of the tension band and preventing displacement thereof in its passage to and from the vulcanizing cylinder, these guides being preferably of wood or like material adapted for contacting the edges of the band and preferably being adjustable toward and from the band.

These and other features of the invention will be best understood and appreciated from the following description of a preferred embodiment thereof, selected for purposes of illustration and shown in the accompanying drawings, in which Fig. 1 is a view of the machine in side elevation;

Fig. 2 is a view of the machine in end elevation;

Figs. 3 and 4 are detail views of the band guiding mechanism;

Fig. 5 is a fragmentary view in side elevation, and on an enlarged scale, of the heated pressure drum and associated mechanism;

Fig. 6 is a corresponding view in vertical cross section; and

Fig. 7 is a fragmentary view in cross section of the mounting of the drum.

Figure 1:
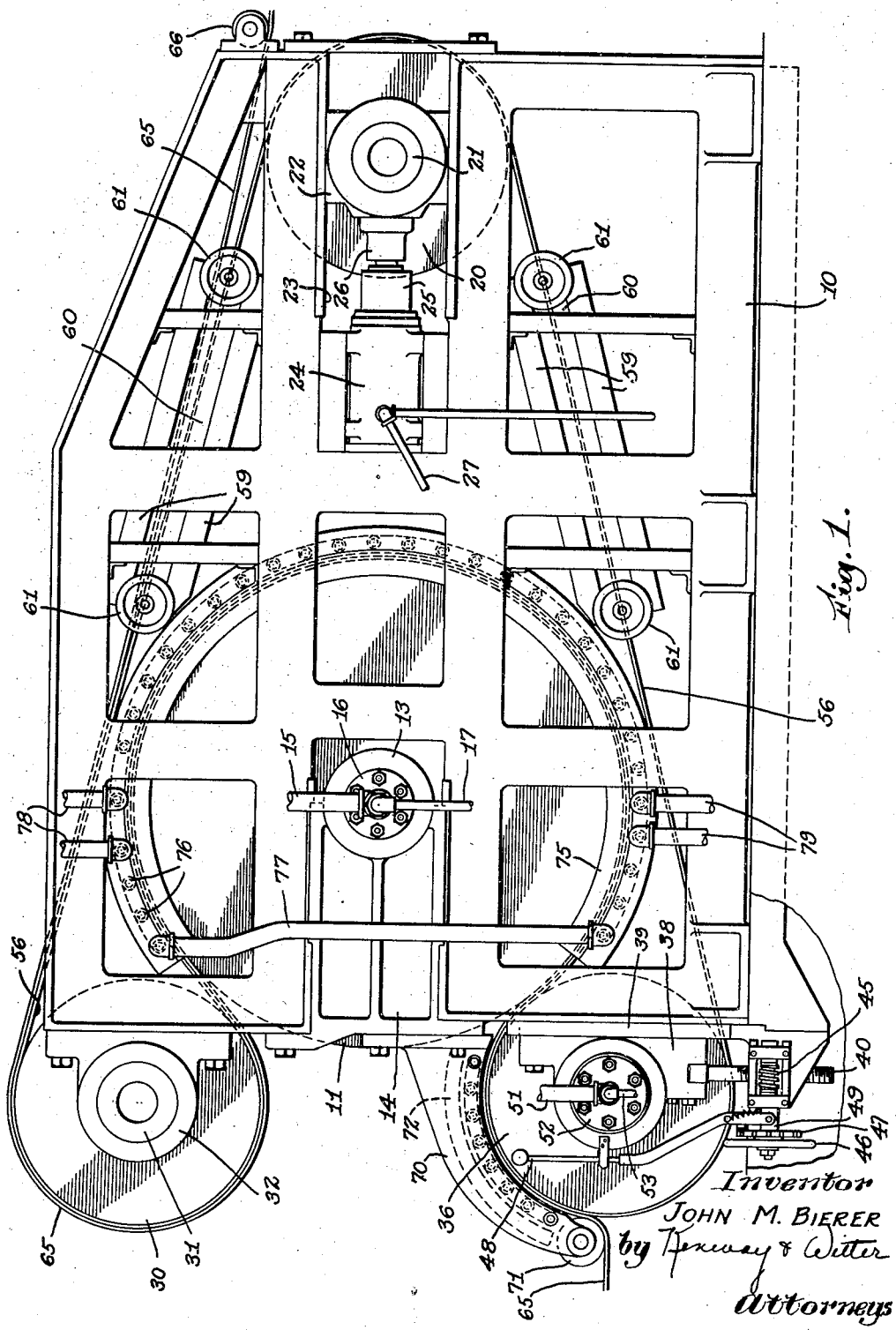

The heavy metal frame of the machine comprises spaced side members 10 of similar shape rigidly connected and supported upon a concrete foundation. The frame is designed to support three drums or rolls, over which passes a tension band in a generally triangular path with a reentrant loop extending about the periphery of a large vulcanizing cylinder supported by the frame within the general outline of the path of the band.

The vulcanizing cylinder 11 is provided with outwardly-extending hollow hubs 12 which rotate in bearing boxes 13 formed as a part of rectangular carrier members 14 which are bolted in place in the side frames 10 of the machine. The vulcanizing cylinder is heated by steam admitted through its right-hand hub, as seen in Fig. 2, by a steam pipe 15. A steam-tight joint is formed between the rotating hub and the pipe 15 by a gland or stuffing box 16, and a return pipe 17 for condensation is arranged to pass into the cylinder concentrically within the pipe 15. The left-hand hub is closed by a flat cover plate 18. The heated cylinder is thus mounted for free rotation in the frame. Its peripheral surface may be smooth or it may be etched or otherwise configured to act as a molding surface in treating the product to be vulcanized.

A tension drum or roll 20 arranged to rotate with a transverse shaft 21 is journaled in bearing boxes 22. These boxes are mounted to slide horizontally in ways 23 formed in the side members 10 of the machine frame and each box is connected through a pressure head 26 to the piston 25 of an hydraulic cylinder 24 which is bolted in place in the side frame. Hydraulic pressure is maintained within the cylinders 24 through piping 27 from an accumulator or other suitable source of pressure, and the arrangement is such as to maintain a constant pressure outwardly upon the tension drum 20 and so to subject the tension band to a yielding uniform tension during the operation of the machine.

A driving drum or roll 30 journaled to turn with a shaft 31 is mounted in bearing boxes bolted to the upper left end of the frame, as shown in Fig. 1. The shaft 31 is provided at one end with a large driving gear 33. This may be driven at a slow rate of rotation from any suitable source of power and receives the mechanical input of power required to drive the machine.

A heated pressure drum or roll 36 provided with hollow hubs 37 is journaled in bearings boxes 38 which are adjustably mounted in ways 39 secured to the lower left end of the machine frame. The ways 39 contain undercut grooves, as shown in Fig. 7, and attaching bolts pass through the bearing boxes 38 into nuts which are slidably held within these grooves. When the bolts are loosened the bearing boxes are free for vertical adjustment and they may be conveniently retained in any position of adjustment by tightening the bolts. Each bearing box is supported by a jack screw 40 connected at its upper end by a pivot pin 41 to ears formed at the lower end of the bearing box. A worm wheel nut 42 is threaded upon each jack screw and supported in ball bearings between a supporting block 43 and a threaded plug 44, both contained within a bracket member bolted to the machine frame. The worm wheel nut 42 meshes with a horizontal worm 45 journaled in a bracket, also bolted to the machine frame. Each worm is provided at its outer end with a hand wheel 46 and with a ratchet wheel 47. An operating lever 48 is pivotally supported at its lower end upon a sleeve 49 freely rotatable upon the worm and located adjacent to the ratchet wheel 47. The operating lever 48 is provided with a detent which may be brought into operative engagement with one of the teeth of the ratchet wheel by swinging the lever outwardly against the tension of a spring which holds it normally in inoperative position. It will be understood that the worm may be rotated either through the medium of its hand wheel 46 or, if more power is required, by manipulating the operating lever 48, swinging it first outwardly and then transversely about the axis of the worm.

The pressure drum or roll 36 is internally heated by steam supplied through a pipe 51 which enters its right-hand hub, as shown in Fig. 6, through a gland or stuffing box 52. A return pipe 53 for condensation is led into the drum concentrically within the steam supply pipe. The left-hand hub is closed by a cover plate 54. The guides 39 are so located that the drum 36 may be moved vertically into actual contact with the periphery of the vulcanizing cylinder 11 at a point in its circumference somewhat below its horizontal axis. In practice, both the tension band 56 and the material 65 to be treated are interposed between these two freely rotating members and the effect of the drum 36 is to guide the tension band 56 in a loop about substantially 270° of its circumference, to press the band against the circumference of the vulcanizing cylinder 11, and then to release it for travel about the circumference of the cylinder.

The tension band 56 may be an endless steel band or it may comprise a metallic base having plastic material molded thereon to provide a non-metallic work-engaging surface. As will be apparent from the foregoing description, the band 56 passes continuously about the three drums 20, 30, 36 and the vulcanizing cylinder 11. Traction is imparted to it by the driving drum 30 and it, in turn, imparts rotation to the other two drums and the vulcanizing cylinder.

The band 56 is guided in the proper path and held against transverse displacement by two sets of guides located in the path of the band between the vulcanizing cylinder 11 and the tension drum 20. These are shown in detail in Figs. 3 and 4 and comprise a series of wooden blocks 58 bolted together and each series retained in a channel iron 60. The channel irons are mounted for movement in the plane of the band between angle irons 59 bolted to the inner faces of the side members 10 of the frame. Adjusting screws 61 provided with hand wheels are mounted at each end of each guide in brackets 62 secured to the frame. By turning the hand wheels 61 the guide blocks may be advanced into contact with the opposite edges of the band 56 and the path of the band may thus be accurately controlled in a transverse sense. A guide roll 66 is mounted in the upper right-hand portion of the frame for guiding the vulcanized material out of the machine.

The heated pressure drum 36 is provided with an external heater and work guide comprising curved brackets 70 which are bolted to the ends of the side frame and extend over about 90° of the circumference of the drum 36. At the outer end the brackets carry a guide roll 71 for directing the material to be vulcanized to the surface of the heated pressure drum 36. The curved brackets 70 are hollowed out at their inner faces to receive a curved heater 72 in which are embedded transverse steam pipes 73. The pipes are connected to form a continuous system and the system is open at opposite ends for connection with supply and return pipe, not herein shown.

The vulcanizing cylinder 11 is also provided with a curved heater 75 which embraces substantially 270° of its circumference and includes a series of transverse steam pipes 76. These are connected in a continuous system, connected at their ends by an intermediate pipe 77 and supplied with steam by a pair of supply pipes 78. Return pipes 79 for condensation lead from the bottom of the heating system.

The manner of operating the machine will be clear from the foregoing description but may be summarized as follows. The vulcanizing cylinder 11 and the heated pressure drum 36, together with the heaters 72 and 75, are continuously maintained at suitable vulcanizing temperature by steam supplied in the manner already explained. The tension band 56 is maintained under continuous tension by the action of the hydraulic cylinders 24 and is driven at a slow rate of speed by the driving drum 30. In its progress it imparts rotary movement to the other drums of the machine. The material 65 to be vulcanized is led into the machine in continuous strip form, passing beneath the guide roll 71 and upwardly about a portion of the periphery of the heated pressure drum 36. During this portion of its travel the material is raised substantially to a vulcanizing temperature, being thus preliminarily heated to a degree that insures the initiation of the vulcanizing operation immediately when the material reaches the vulcanizing cylinder 11. In passing about the drum 36, the material 65 rests upon the surface of the tension band 56 but is not subjected to pressure thereby. When, however, the material 65 passes to the surface of the vulcanizing cylinder 11, it becomes located between the tension band 56 and the surface of the cylinder, which is also heated to vulcanizing temperature. The material 65 is, therefore, subjected to severe pressure in its passage about the cylinder 11 and to particularly severe pressure along the line of its first contact with the cylinder because in this location the band 56 is positively pressed toward the cylinder by the heated pressure drum 36. After the material 65 passes beyond the bite of these two rotary members, it travels perhaps 300° in contact with the circumference of the vulcanizing cylinder 11, being meanwhile subjected to the pressure of the tension band 56 and to the vulcanizing heat of the drum and the circumferential heater 75. It is during this portion of its travel that the material 65 is molded into conformity with the surface of the cylinder 11 and completely vulcanized. After leaving the circumference of the cylinder 11, the material 65 remains in engagement with the outer face of the tension band 56 in passing about the driving drum 30 and in traveling across the top of the machine between the uppermost set of edge guides, where it is gradually separated from contact with the band 56 and guided beneath the guide roll 66 out of the machine.

The advantages incident to my invention are believed to be apparent, especially when viewed in connection with the prior art. The utilizing of a single heated roll to carry one loop of the metal band and also to serve as a pressure roll against the vulcanizing cylinder and a guide roll for the web to be vulcanized eliminates the use of one or more extra rolls for flattening or molding the material on the vulcanizing cylinder and guiding it thereto, permits this operation to be performed at the bite of the metal band with the cylinder, and permits the use of a pressure roll of relatively large diameter. Thus the material to be vulcanized is molded to uniform diameter immediately as it engages the vulcanizing cylinder and is thereafter undisturbed during vulcanization in its entire travel with the cylinder. The use of a pressure roll of relatively large diameter causes less distorting and stress of the tension band than is the case with rolls of small diameter and a large roll also functions to produce a more uniform and denser product and a firmer and more uniform bond between the plies of the product.

The preheating of the material prior to its contact with the vulcanizing cylinder permits of the molding treatment immediately upon contact of the material with the cylinder, thus increasing the output of the machine by increasing the effective vulcanizing space and period. It will also be understood that the preheating treatment may be varied by varying the temperature thereof or by varying in length of the preheater 72. The use of a large pressure roll furthermore permits the employment in the machine of a thicker tension band which will withstand contacts of greater pressure better than bands made thin and flexible enough to wrap about rolls of small diameter.

Having thus described my invention, what I claim as new and desire to secure by Letters Patent is:

1. A machine for vulcanizing a continuous web of sheet material, comprising a vulcanizing cylinder, a tension band movable about the circumference thereof, a heated pressure roll arranged to press said band against the cylinder and to guide the web to be vulcanized thereto, and a curved preheater cooperating with said pressure roll and extending outwardly from the vulcanizing cylinder for a substantial distance whereby the material to be treated may be heated before it reaches the vulcanizing cylinder.

2. A machine for vulcanizing a continuous web of sheet material comprising a vulcanizing cylinder, a tension band movable about the circumference of the cylinder and adapted to receive at the bite thereof with the cylinder and press against the cylinder the material to be vulcanized, a preheater forwardly of said bite for heating the material before it reaches the vulcanizing cylinder, and a roll adjacent to the bite arranged to press the band toward the cylinder in a manner molding the preheated material therebetween.

3. A machine for vulcanizing a continuous web of sheet material comprising a vulcanizing cylinder, a tension band movable about the circumference of the cylinder and adapted to receive at the bite thereof with the cylinder and press against the cylinder the material to be vulcanized, a preheater extending forwardly from the bite and providing a heated and relatively long material receiving chamber, the material being adapted to pass through the preheater in a continuous movement to the bite and to be heated to a molding condition during such passage, and a roll arranged to press the band toward the cylinder in a manner molding the preheated material therebetween after the material reaches the vulcanizing cylinder.

4. A vulcanizing machine comprising a heated vulcanizing cylinder, a heated pressure roll disposed with its periphery adjacent to the periphery of the cylinder, an endless band deflected about a portion of the periphery of the cylinder and about a portion of the periphery of the roll in a manner providing a bite between the band and the cylinder, the heated pressure roll being adapted to preheat the band as it travels toward said bite, means for feeding strip stock to be vulcanized onto the band at a point substantially in advance of said bite and holding such stock in contact with a substantial arcuate portion of the exterior surface of the heated band opposite to the roll as the band and stock travel with the roll toward said bite, and means supporting the heated roll in position wherein its periphery is so closely adjacent to the periphery of the cylinder at said bite as to compress the heated stock between the cylinder and the band and roll.

5. A vulcanizing machine comprising a heated vulcanizing cylinder, a heated pressure roll disposed with its periphery adjacent to the periphery of the cylinder, an endless band deflected about a portion of the periphery of the cylinder and about a portion of the periphery of the roll in a manner providing a bite between the band and the cylinder, means outside of and cooperating with said peripheral portion of the heated pressure roll and the band thereon for preheating strip stock carried thereby and rendering the stock more plastic as the stock travels with the band about and with the roll toward said bite, and means for adjustably supporting the heated roll in position wherein its periphery is so closely adjacent to the periphery of the cylinder at said bite as to compress the stock between the cylinder and the band and roll.

6. A method of continuously vulcanizing strip material, characterized by the steps of continuously feeding such material to a vulcanizing position, so preheating said material during the feeding movement thereof that it reaches said position in a more plastic condition, continuously conducting the preheated material along a vulcanizing path between moving pressure-applying surfaces, one of which is flexible, applying a severe local pressure to the material through the medium of said flexible surface as the material enters said path, and thereafter maintaining a lesser degree of pressure upon and vulcanizing the material during its further travel along said path.

7. In a machine of the class described, an endless band, means including a cylinder and a roll about and upon which the band is tensioned, a pair of relatively long and oppositely disposed guides located respectively at the opposite edges of the band between the cylinder and roll and each having a straight portion for engaging the adjacent edge of the band, means for supporting each of said guides for movement toward and from the band but preventing movement thereof in a relatively transverse direction, and means adjacent to the ends of the guides for adjusting the guides toward and from the band.

JOHN M. BIERER.